United States Patent
Ogino et al.

(10) Patent No.: US 8,957,995 B2
(45) Date of Patent: Feb. 17, 2015

(54) IMAGE PROCESSING APPARATUS AND CONTROL METHOD THEREOF

(75) Inventors: Hiroshi Ogino, Tokyo (JP); Yuji Koide, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 8 days.

(21) Appl. No.: 13/879,123

(22) PCT Filed: Sep. 16, 2011

(86) PCT No.: PCT/JP2011/071772
§ 371 (c)(1),
(2), (4) Date: Apr. 12, 2013

(87) PCT Pub. No.: WO2012/053315
PCT Pub. Date: Apr. 26, 2012

(65) Prior Publication Data
US 2013/0194463 A1 Aug. 1, 2013

(30) Foreign Application Priority Data
Oct. 21, 2010 (JP) ................ 2010-236845

(51) Int. Cl.
*H04N 9/64* (2006.01)
*G06K 9/40* (2006.01)
*H04N 5/365* (2011.01)
*H04N 5/217* (2011.01)

(52) U.S. Cl.
CPC ............. *H04N 5/365* (2013.01); *H04N 5/2176* (2013.01); *H04N 5/3658* (2013.01)
USPC .......................................... 348/243; 382/260

(58) Field of Classification Search
CPC ..... H04N 5/2176; H04N 5/361; H04N 5/365; H04N 5/3651; H04N 5/3658; H04N 5/16; H04N 5/165
USPC .......... 348/243, 251, 257, 615; 382/260, 264, 382/274, 275
See application file for complete search history.

(56) References Cited

U.S. PATENT DOCUMENTS

| | | | | |
|---|---|---|---|---|
| 5,881,182 A | * | 3/1999 | Fiete et al. ................... | 382/275 |
| 7,689,059 B2 | * | 3/2010 | Okada .......................... | 382/274 |
| 7,948,533 B2 | * | 5/2011 | Koseki ......................... | 348/243 |
| 7,956,909 B2 | | 6/2011 | Takahashi et al. | |
| 7,982,785 B2 | * | 7/2011 | Kinoshita et al. ............ | 348/248 |
| 8,228,402 B2 | | 7/2012 | Egawa | |

(Continued)

FOREIGN PATENT DOCUMENTS

| | | |
|---|---|---|
| EP | 2053842 A | 4/2009 |
| JP | 2006-311086 A | 11/2006 |

(Continued)

OTHER PUBLICATIONS

Related U.S. Appl. No. 13/238,845, filed Sep. 21, 2011.

*Primary Examiner* — John Villecco
(74) *Attorney, Agent, or Firm* — Cowan, Liebowitz & Latman, P.C.

(57) ABSTRACT

A black image captured in a light-shielded state is obtained, and the streak intensity is determined for each pixel of the black image from the absolute value of an AC component in a region containing the pixel. An extraction image which extracts streak-like fixed pattern noise in a captured image is generated using a black image obtained by applying, to the obtained black image, the first filter for reducing random noise in the first direction.

8 Claims, 4 Drawing Sheets

(56) References Cited

U.S. PATENT DOCUMENTS

| | | |
|---|---|---|
| 8,269,864 B2 | 9/2012 | Gerstenberger et al. |
| 8,421,888 B2 * | 4/2013 | Koseki .......................... 348/243 |
| 8,441,560 B2 * | 5/2013 | Yanai ............................ 348/243 |
| 2008/0239110 A1 * | 10/2008 | Hara ............................. 348/241 |
| 2009/0103829 A1 | 4/2009 | Takahashi et al. |
| 2010/0231761 A1 * | 9/2010 | Yanai ............................ 348/243 |
| 2011/0141324 A1 * | 6/2011 | Koseki .......................... 348/241 |
| 2012/0099007 A1 * | 4/2012 | Ogino et al. ................... 348/243 |
| 2012/0224086 A1 * | 9/2012 | Takita ........................... 348/243 |
| 2013/0093912 A1 * | 4/2013 | Uchida ........................ 348/222.1 |

FOREIGN PATENT DOCUMENTS

| | | |
|---|---|---|
| JP | 2007-028026 A | 2/2007 |
| JP | 2009-033321 A | 2/2009 |
| JP | 2010-041437 A | 2/2010 |

* cited by examiner

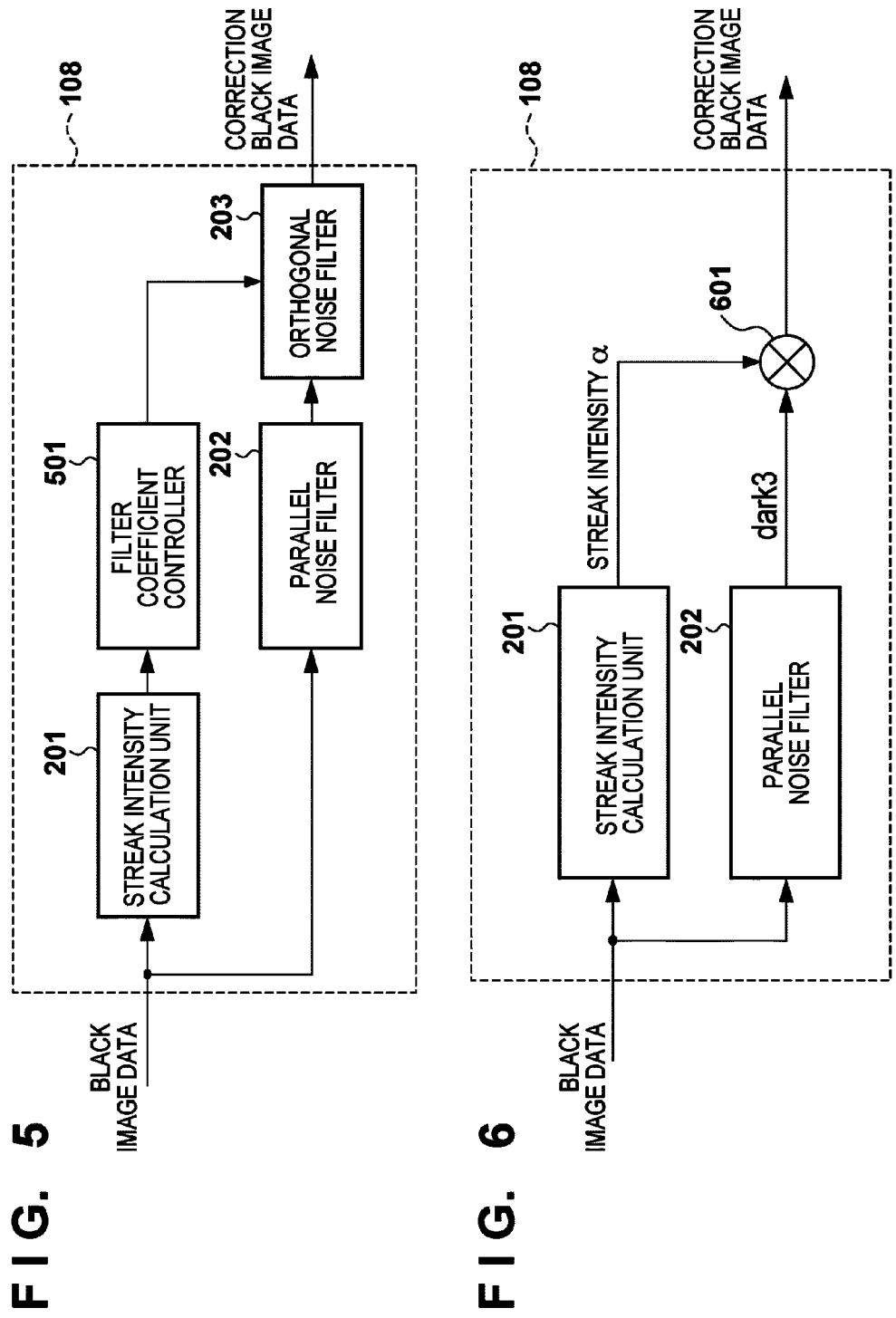

IMAGE PROCESSING APPARATUS AND CONTROL METHOD THEREOF

CROSS-REFERENCE TO RELATED APPLICATIONS

This application is a national stage application of International Application No. PCT/JP2011/071772, filed Sep. 16, 2011, whose benefit is claimed and which claims the benefit of Japanese Patent Application No. 2010-236845, the entire disclosures of which are incorporated herein by reference.

TECHNICAL FIELD

The present invention relates to a technique of reducing fixed pattern noise in a captured image.

BACKGROUND ART

An image sensor such as a CCD sensor or CMOS sensor sometimes generates streak-like fixed pattern noise called a "vertical streak" in a captured image owing to nonuniformity of a dark current in a vertical transfer path and degradation in transferring. As a method for correcting the generated fixed pattern noise, a technique, where the output signal (black image) of an image sensor that is obtained in a light-shielded state is stored in advance, and subtracted from a captured image (black subtraction process), is known.

However, the black image contains not only fixed pattern noise but also random noise. In an image obtained by subtracting a black image from a captured image, random noise stands out much more than in an image before subtraction. To prevent this, a technique is known whereby random noise from a black image is reduced to generate an extraction image which extracts streak-like fixed pattern noise.

Japanese Patent Laid-Open No. 2007-028026 discloses a technique of reducing random noise by applying a median filter using a row or column of an image sensor as one process unit. Japanese Patent Laid-Open No. 2006-311086 discloses a technique of storing a plurality of black images and suppressing uncorrelated random noise contained in these black images.

However, streak-like fixed pattern noise may change in streak intensity for each region even on a single streak. For this reason, applying a random noise reduction filter using a row or column as a unit may generate a streak in a region low in streak intensity or a region free from a streak owing to overcorrection like Japanese Patent Laid-Open No. 2007-028026. Also, obtaining a plurality of black images, like Japanese Patent Laid-Open No. 2006-311086, may increase an area for storing these black images and prolong the process time by a plurality of black image capturing processes.

SUMMARY OF INVENTION

The present invention has been made to solve the above problems. The present invention provides obtaining an image which extracts streak-like fixed pattern noise by appropriately reducing random noise in one black image.

The present invention in its first aspect provides an image processing apparatus which generates an extraction image which extracts streak-like fixed pattern noise in a captured image, comprising: obtaining means for obtaining a black image which is captured in a light-shielded state and contains streak-like fixed pattern noise; deriving means for deriving, for each pixel of the black image obtained by the obtaining means, an AC component in a first direction in a region containing the pixel; determination means for determining an intensity of the streak in each pixel of the black image in accordance with an absolute value of the AC component in the first direction that has been derived by the deriving means; first reduction means for applying, to the black image obtained by the obtaining means, a first filter for reducing noise in a second direction intersecting the first direction; and output means for generating the extraction image using the black image to which the first reduction means has applied the first filter.

Further features of the present invention will become apparent from the following description of exemplary embodiments (with reference to the attached drawings).

BRIEF DESCRIPTION OF DRAWINGS

FIG. 5 is a block diagram showing the functional arrangement of an extraction image generator according to a modification of the present invention; and FIG. 6 is a block diagram showing the functional arrangement of an extraction image generator according to the second embodiment of the present invention.

DESCRIPTION OF EMBODIMENTS

First Embodiment

A preferred embodiment of the present invention will now be described in detail with reference to the accompanying drawings. The following embodiment will exemplify an application of the present invention to a digital camera serving as an example of an image processing apparatus that can correct streak-like fixed pattern noise in a captured image by using a random noise-reduced black image. However, the present invention is applicable to an arbitrary device capable of reducing random noise contained in a black image.

Figure 1:
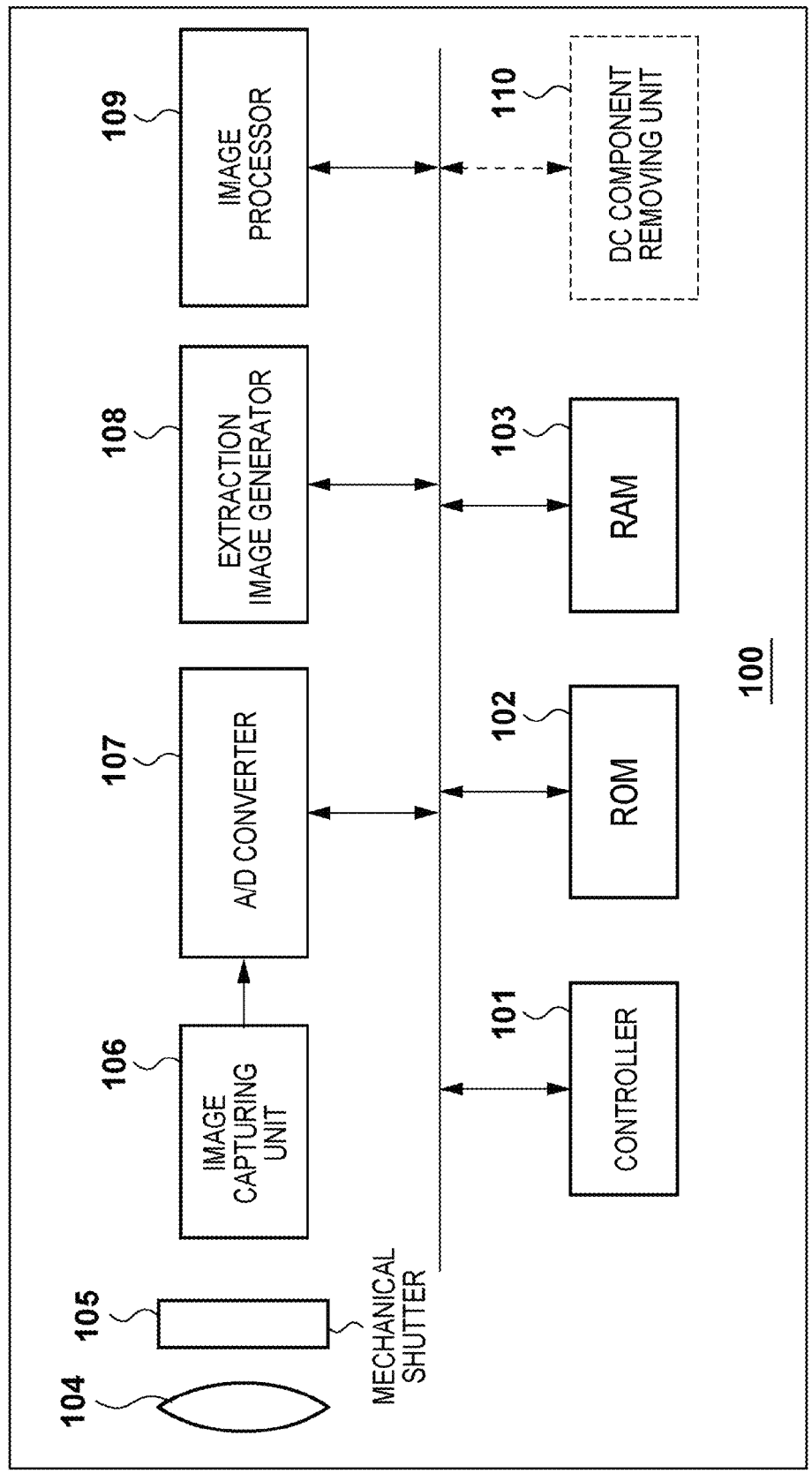
FIG. 1 is a block diagram showing the functional arrangement of a digital camera according to an embodiment of the present invention.

FIG. 1 is a block diagram showing the functional arrangement of a digital camera 100 according to the embodiment of the present invention.

A controller 101 is, for example, a microprocessor. The controller 101 controls the operation of each block of the digital camera 100 by reading out the operation program of the block that is stored in a ROM 102, expanding it in a RAM 103, and executing it. The ROM 102 is, for example, a rewritable nonvolatile memory like a flash memory. In addition to the operation program of each block of the digital camera 100, the ROM 102 stores parameters, settings, and the like necessary for the operation of each block. The RAM 103 is a rewritable volatile memory and is a temporary storage area for data generated by each block of the digital camera 100. The RAM 103 also stores a correction black image for reducing streak-like fixed pattern noise from a captured image. The correction black image is an image which is obtained by reducing random noise from a black image captured in the light-shielded state and extracts streak-like fixed pattern noise.

An image capturing unit 106 includes an image sensor such as a CCD sensor or CMOS sensor. The image capturing unit 106 photo-electrically converts an optical image formed on the image sensor via an optical system 104, and outputs the obtained analog image signal to an A/D converter 107 (to be described later). A mechanical shutter 105 is a block which adjusts the exposure time by physically cutting off the optical path. In this specification, the A/D converter 107 (to be described later) A/D-converts an image captured in the light-shielded state in which the mechanical shutter 105 is completely closed in accordance with conditions to capture an image. Then, the RAM 103 stores the obtained image as a black image. The A/D converter 107 applies an A/D conversion process to an input analog image signal, obtaining a digital image.

An extraction image generator 108 is a block which reduces random noise other than streak-like fixed pattern noise in a black image captured in the light-shielded state, and outputs a correction image for reducing streak-like fixed pattern noise. More specifically, the extraction image generator 108 generates a black image which extracts streak-like fixed pattern noise in order to reduce streak-like fixed pattern noise from an image captured while the mechanical shutter 105 is open.

An image processor 109 outputs an image from which streak-like fixed pattern noise is reduced by subtracting, from an image captured while the mechanical shutter 105 is open, the black image which is generated by the extraction image generator 108 and extracts streak-like fixed pattern noise. Further, the image processor 109 performs various signal processes such as color separation, aperture correction, gamma correction, and white balance correction for the streak-like fixed pattern noise-reduced image.

Extraction of Fixed Pattern Noise

A process sequence to generate a black image used to correct streak-like fixed pattern noise in the digital camera 100 having the above arrangement according to the embodiment will be further explained below with reference to the accompanying drawings.

First, the controller 101 obtains image capturing parameters such as the sensitivity setting and exposure time set in the digital camera 100 when, for example, opening the mechanical shutter 105 to capture an image. Then, the controller 101 closes the mechanical shutter 105, and outputs an analog image signal from the image capturing unit 106 to the A/D converter 107 in the light-shielded state under the same conditions as the obtained image capturing parameters. The controller 101 controls the A/D converter 107 to A/D-convert the input analog image signal and output a black image. The controller 101 controls the RAM 103 to store the black image output from the A/D converter 107. At this time, the black image stored in the RAM 103 contains streak-like fixed pattern noise and random noise. The black image may be image data thinned by reading out at least one or more fields by field reading.

The controller 101 reads out, from the RAM 103, the black image containing streak-like fixed pattern noise and random noise, and outputs it to the extraction image generator 108. The controller 101 controls the extraction image generator 108 to generate a random noise-reduced correction black image, that is, an extraction image which extracts streak-like fixed pattern noise.

Figure 2:
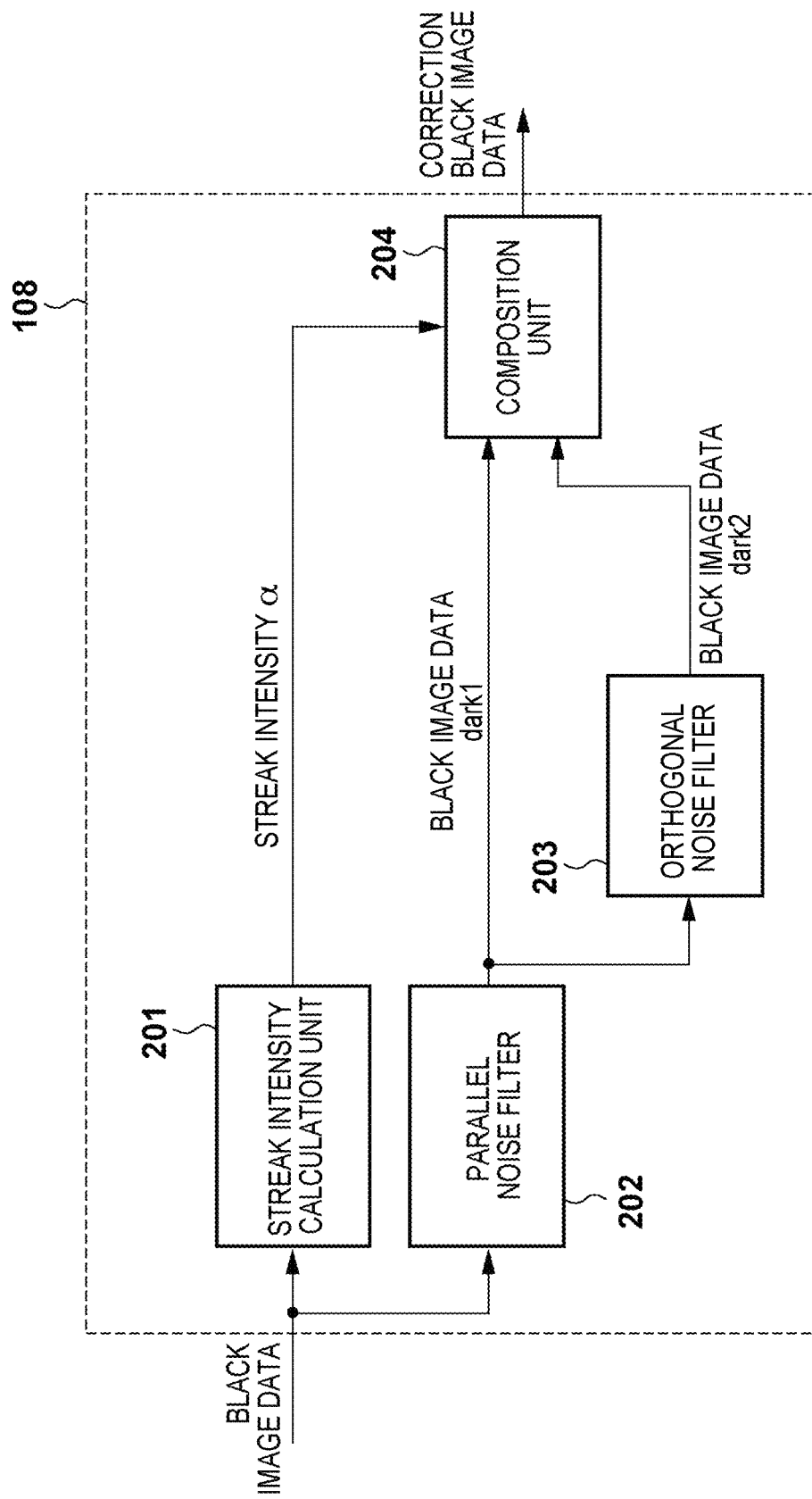
FIG. 2 is a block diagram showing the functional arrangement of an extraction image generator according to the first embodiment of the present invention.

An extraction image generation process by the extraction image generator 108 will be explained below with reference to FIG. 2. When a black image read out from the RAM 103 is input to the extraction image generator 108, it is input to a streak intensity calculation unit 201 and parallel noise filter 202.

Figure 3:
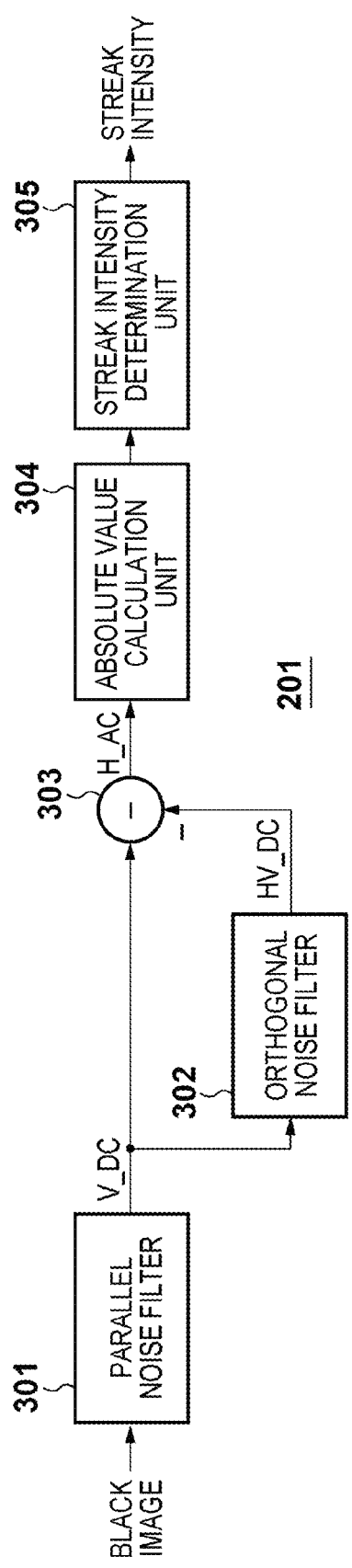
FIG. 3 is a block diagram showing the circuit arrangement of a streak intensity calculation unit according to embodiments of the present invention.

The streak intensity calculation unit 201 has a circuit arrangement as shown in FIG. 3. The streak intensity calculation unit 201 detects the intensity of streak-like fixed pattern noise (amplitude of streak-like fixed pattern noise) contained in the black image for each region. More specifically, a region containing a target pixel is set for each target pixel in the black image input to the streak intensity calculation unit 201. Each block executes a process for each region of the black image, determining a streak intensity $\alpha$ indicating the streak intensity of each target pixel.

First, to remove a high-frequency component parallel to a streak, a parallel noise filter 301 applies, to each region of the input black image, a low-pass filter in a direction parallel to the streak. More specifically, when streak-like fixed pattern noise contained in the black image is a streak generated in the vertical (V) direction of the image, the parallel noise filter 301 outputs the vertical DC component of each region of the black image input to the streak intensity calculation unit 201. Note that the low-pass filter in a direction parallel to the streak can be a filter configured to average the values of a predetermined number of pixels such as 25 pixels which contain the target pixel as a center and have the same coordinate in the horizontal (H) direction as that of the target pixel in a direction parallel to the streak.

Then, to remove a high-frequency component in a direction orthogonal to the streak, an orthogonal noise filter 302 applies a low-pass filter in a direction orthogonal to the streak, to a DC component in a direction parallel to the streak in each region of the black image that has been output from the parallel noise filter 301. Accordingly, the orthogonal noise filter 302 outputs a two-dimensional DC component for each region of the black image input to the streak intensity calculation unit 201.

A subtracter 303 subtracts the thus-obtained DC component in a direction parallel to the streak in each region of the black image input to the streak intensity calculation unit 201, and the two-dimensional DC component in each region of the black image. More specifically, the subtracter 303 subtracts the two-dimensional DC component in each region of the black image from the DC component in a direction parallel to the streak in each region of the black image, thereby deriving an AC component in a direction orthogonal to the streak in each pixel of the black image.

An absolute value calculation unit 304 converts the AC component in a direction orthogonal to the streak in each pixel of the black image that has been output from the subtracter 303, into the absolute value of the AC component, and outputs the absolute value to a streak intensity determination unit 305. The streak intensity determination unit 305 determines the streak intensity $\alpha$ of each pixel of the black image in accordance with the input absolute value of the AC component. More specifically, the streak intensity determination unit 305 determines the streak intensity of each pixel of the black image using, for example, a function as shown in FIG. 4.

Figure 4:
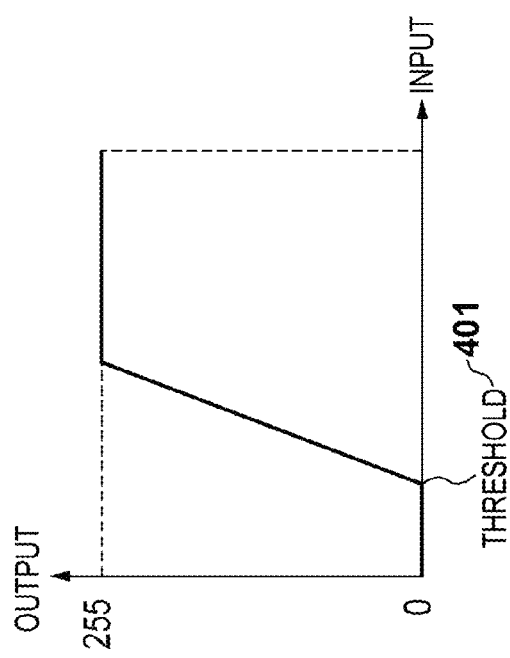
FIG. 4 is a graph for explaining the streak intensity according to embodiments of the present invention.

In FIG. 4, the abscissa indicates the absolute value of the AC component, and the ordinate indicates the streak intensity. The streak intensity is given by, for example, an 8-bit value. A streak intensity of 0 means that the target pixel is not a streak, and a streak intensity of 255 means that the target pixel is a streak. Also, a streak intensity of 1 to 254 means a streak at which it is difficult to determine whether the target pixel is a streak. Note that a threshold 401 in FIG. 4 can be a value at which the absolute value of the AC component in a direction orthogonal to the streak is much smaller than the amplitude of random noise and no streak-like fixed pattern noise can be recognized. The streak intensity determination unit 305 normalizes the determined streak intensity and outputs the streak intensity α (≤1).

Further, to reduce random noise serving as a high-frequency component in a direction parallel to the streak, the parallel noise filter 202 applies, to the input black image, a low-pass filter in a direction parallel to the streak. Note that the low-pass filter in a direction parallel to the streak can be a filter configured to average the values of a predetermined number of pixels such as 25 pixels which contain the target pixel as a center and have the same coordinate as that of the target pixel in a direction parallel to the streak.

Also, an orthogonal noise filter 203 applies a low-pass filter in a direction orthogonal to the streak, to the black image output from the parallel noise filter 202 to which the low-pass filter in a direction parallel to the streak has been applied. Note that the low-pass filter in a direction orthogonal to the streak can be a filter configured to average the values of a predetermined number of pixels such as 25 pixels which contain the target pixel as a center and have the same coordinate as that of the target pixel in a direction orthogonal to the streak.

The filter coefficients (for example, a predetermined number of pixel values) of the low-pass filters in directions parallel to and orthogonal to the streak may be set in accordance with the amplitude of random noise to be reduced. The filter coefficients may be set in advance for a pattern of image capturing conditions such as the sensitivity setting, stored in the ROM 102, and read out in a process of generating a black image used to correct streak-like fixed pattern noise.

A composition unit 204 receives the streak intensity α output from the streak intensity calculation unit 201, a black image dark1 output from the parallel noise filter 202, and a black image dark2 output from the orthogonal noise filter 203, and composites them. More specifically, the composition unit 204 composites the pixel values of respective pixels by weighted-adding in accordance with equation (1), thereby generating a correction black image "hosei_dark" which extracts streak-like fixed pattern noise by reducing random noise:

$$\text{hosei\_dark} = \alpha \times \text{dark1} + (1-\alpha) \times \text{dark2} \quad (1)$$

Accordingly, the weight of the black image to which the low-pass filter in a direction parallel to the streak has been applied can be decreased for a pixel lower in streak intensity. That is, for a pixel having no streak or a pixel small in streak amplitude, applying the low-pass filter in a direction parallel to the streak adversely increases the streak amplitude. To prevent this, the degree of applying the low-pass filter in a direction parallel to the streak is decreased. In contrast, increasing the degree of applying the low-pass filter in a direction orthogonal to the streak can reduce random noise in a direction orthogonal to the streak. Therefore, random noise can be properly reduced in each pixel of the black image. Since the streak intensity α can be set for each pixel, generation of an over-corrected region can be suppressed even if the streak intensity changes on a single streak. Shading can also be corrected similarly to a conventional black subtraction process. Note that no black image need always be captured in every shooting. It suffices to capture a black image in accordance with the characteristics of the image sensor, as needed.

As described above, the image processing apparatus according to the embodiment can generate a correction black image which extracts streak-like fixed pattern noise by appropriately reducing random noise in a black image captured in the light-shielded state. More specifically, the image processing apparatus obtains a black image captured in the light-shielded state, and determines a streak intensity from the absolute value of the AC component of each pixel of the black image. Then, the image processing apparatus generates a black image by applying, to the obtained black image, the first filter for reducing random noise in a direction parallel to a streak, and a black image by applying the second filter for reducing random noise in a direction orthogonal to the streak. The first filter-applied black image and second filter-applied black image are composited by weighted-adding in accordance with the streak intensity of each pixel so that the weight of the first filter-applied black image becomes smaller for a pixel lower in streak intensity.

Modification

The first embodiment has described a method of generating a black image in which random noise in a direction parallel to a streak is reduced and a black image in which random noise in a direction orthogonal to the streak is reduced, and compositing them by weighted-adding in accordance with the streak intensity. The modification will explain a method of outputting a correction black image in which random noise is appropriately reduced in each pixel of a black image, without preparing two black images to which different filters are applied. The modification will describe an application to the digital camera 100 having the same functional arrangement as that in the first embodiment, so a description of each block of the digital camera 100 will not be repeated.

FIG. 5 shows the functional arrangement of the extraction image generator 108 according to the modification. A black image which has been captured in the light-shielded state and input to the extraction image generator 108 is input to the streak intensity calculation unit 201 and parallel noise filter 202. A low-pass filter for reducing random noise in a direction parallel to a streak is applied to the black image input to the parallel noise filter 202, and the resultant black image is output to the orthogonal noise filter 203.

Information about the streak intensity of each pixel of the input black image that has been calculated by the streak intensity calculation unit 201 is input to a filter coefficient controller 501. The filter coefficient controller 501 controls the filter coefficient of the orthogonal noise filter 203 so that the orthogonal noise filter 203 applies a low-pass filter in a direction orthogonal to the streak in accordance with the streak intensity for each pixel of the black image.

For example, the number of delay lines for filtering is five, and the center is the target pixel. In this case, when the streak intensity α of the target pixel is 0, the filter coefficient of the orthogonal noise filter 203 is determined to be (1, 1, 1, 1, 1)/5. Also, the filter coefficient is determined to be (0, 1, 1, 1, 0)/3 when the streak intensity α of the target pixel satisfies 0<α<1, and (0, 0, 1, 0, 0) when the streak intensity α is 1. That is, the filter coefficient controller 501 controls the intensity of the low-pass filter applied by the orthogonal noise filter 203 to reduce random noise in a direction orthogonal to a streak for a pixel lower in streak intensity.

With this setting, the low-pass filter for reducing random noise in a direction parallel to a streak is applied to a pixel low in streak intensity. Even if the streak amplitude increases, it can be properly decreased. More specifically, an increase in streak amplitude can be suppressed by setting a filter coefficient in a direction orthogonal to the streak for a pixel low in streak intensity so that a streak amplitude upon applying the filter becomes equal to that before applying a low-pass filter in a direction parallel to the streak.

Second Embodiment

The first embodiment and modification have described an example of applying, to a black image captured in the light-shielded state, a filter for reducing random noise in a direction parallel to a streak and further applying a filter for reducing random noise in a direction orthogonal to the streak. The second embodiment will explain a method of applying a filter for reducing random noise in a direction parallel to a streak, and then generating a correction black image without applying a filter for reducing random noise in a direction orthogonal to the streak. A digital camera 100 according to the second embodiment has a functional arrangement in which a DC component removing unit 110 is further arranged in the digital camera 100 described in each of the first embodiment and modification.

The DC component removing unit 110 is a block which removes the DC component of an input image and outputs the resultant image. In the process of removing a DC component, for example, an image obtained by applying low-pass filters to an input image in the horizontal and vertical directions is subtracted from the input image. In the second embodiment, a controller 101 controls to input, to the DC component removing unit 110, a black image captured in the light-shielded state and remove a DC component. By removing the DC component, the influence of a dark current, shading, light emission, and the like in the black image can be removed.

FIG. 6 is a block diagram showing the functional arrangement of an extraction image generator 108 according to the second embodiment. A DC component-removed black image input to the extraction image generator 108 is input to a streak intensity calculation unit 201 and parallel noise filter 202. In the second embodiment, a multiplier 601 multiplies, by the streak intensity α of each pixel that has been determined by the streak intensity calculation unit 201, the pixel of a black image obtained by reducing random noise in a direction parallel to a streak from the DC component-removed black image. As a result, a correction black image is obtained.

In this way, the influence of an AC component can be reduced for a pixel low in streak intensity in a black image having only an AC component after removing a DC component. When subtracting the generated correction black image from a captured image, the pixel value is small in a pixel low in streak intensity and changes only slightly in the captured image. To the contrary, a streak serving as an AC component remains in a pixel high in streak intensity. When subtracting the correction black image from a captured image, only streak information can be subtracted.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-236845, filed Oct. 21, 2010, which is hereby incorporated by reference herein in its entirety.

The invention claimed is:

1. An image processing apparatus which generates an extraction image which extracts streak-like fixed pattern noise in a captured image, comprising:
    an obtaining unit configured to obtain a black image which is captured in a light-shielded state and contains streak-like fixed pattern noise;
    a deriving unit configured to derive, for each pixel of the black image obtained by said obtaining unit, an AC component in a first direction in a region containing the pixel;
    a determination unit configured to determine an intensity of the streak in each pixel of the black image in accordance with an absolute value of the AC component in the first direction that has been derived by said deriving unit;
    a first reduction unit configured to apply, to the black image obtained by said obtaining unit, a first filter for reducing noise in a second direction intersecting the first direction;
    a second reduction unit configured to apply, to the black image to which the first filter has been applied, a second filter for reducing noise in the first direction; and
    an output unit configured to generate the extraction image using the black image to which said first reduction unit has applied the first filter,
    wherein said output unit generates the extraction image, by weighted-adding the black image to which the first filter has been applied and the black image to which the second filter has been applied using a weight of black image based on the intensity of the streak that has been determined by said determination unit, or by applying, to the black image to which the first filter has been applied, the second filter of which the filter coefficient is controlled based on the intensity of the streak that has been determined by said determination unit.

2. The apparatus according to claim 1, wherein said output unit generates the extraction image by weighted-adding the black image to which the first filter has been applied and the black image to which the second filter has been applied, to decrease, for a pixel lower in the intensity of the streak that has been determined by said determination unit, a weight of the black image to which the first filter has been applied.

3. The apparatus according to claim 1, wherein said output unit controls the filter coefficient of the second filter, so as to reduce noise in the first direction for a pixel lower in the intensity of the streak that has been determined by said determination unit, and generates the extraction image by applying, to the black image to which the first filter has been applied, the second filter of which the filter coefficient is controlled.

4. The apparatus according to claim 2, wherein the second filter is a filter configured to average, for a target pixel, a predetermined number of pixels having the same coordinate as a coordinate of the target pixel in the second direction.

5. The apparatus according to claim 1, further comprising a removal unit configured to remove a DC component of the black image for the black image obtained by said obtaining unit, wherein said deriving unit derives, for each pixel of the black image from which said removal means has removed the DC component, an AC component in the first direction in the region containing the pixel, said first reduction unit applies the first filter to the black image from which the DC component has been removed, and said output unit generates the extraction image by multiplying, by the intensity of the streak of each pixel, the pixel of the black image to which said first reduction unit has applied the first filter and from which the DC component has been removed.

6. The apparatus according to claim 1, wherein the first filter is a filter configured to average, for a target pixel, a predetermined number of pixels having the same coordinate as a coordinate of the target pixel in the first direction.

7. The apparatus according to claim 1, wherein the first direction is a direction orthogonal to the streak, and the second direction is a direction parallel to the streak.

8. A method of controlling an image processing apparatus which generates an extraction image which extracts streak-like fixed pattern noise in a captured image, comprising:

an obtaining step of obtaining a black image which is captured in a light-shielded state and contains streak-like fixed pattern noise;

a deriving step of deriving, for each pixel of the black image obtained in the obtaining step, an AC component in a first direction in a region containing the pixel;

a determination step of determining an intensity of the streak in each pixel of the black image in accordance with an absolute value of the AC component in the first direction that has been derived in the deriving step;

a first reduction step of applying, to the black image obtained in the obtaining step, a first filter for reducing noise in a second direction intersecting the first direction; and a second reduction step of applying, to the black image to which the first filter has been applied, a second filter for reducing noise in the first direction;

an output step of generating the extraction image using the black image to which the first filter has been applied in the first reduction step, wherein in the output step, the extraction image is generated, by weighted-adding the black image to which the first filter has been applied and the black image to which the second filter has been applied using a weight of black image based on the intensity of the streak that has been determined in the determination step, or by applying, to the black image to which the first filter has been applied, the second filter of which the filter coefficient is controlled based on the intensity of the streak that has been determined in the determination step.

* * * * *